March 7, 1967 R. G. PIETY ETAL 3,308,385
SIGNAL COHERENCE MEASUREMENT
Filed Nov. 15, 1963 2 Sheets-Sheet 1

INVENTORS
R.G. PIETY
D.G. STERRY
BY *Young & Quigg*
ATTORNEYS

INVENTORS
R. G. PIETY
D. G. STERRY
BY Young & Quigg
ATTORNEYS

United States Patent Office 3,308,385
Patented Mar. 7, 1967

3,308,385
SIGNAL COHERENCE MEASUREMENT
Raymond G. Piety and Dan G. Sterry, Bartlesville, Okla., assignors to Phillips Petroleum Company, a corporation of Delaware
Filed Nov. 15, 1963, Ser. No. 324,104
7 Claims. (Cl. 328—137)

This invention relates to the measurement of the degree of correlation between signals.

In the field of geophysical prospecting, it is common practice to impart vibrations to the earth and record the resulting vibrations at a plurality of locations spaced from the point at which the vibrations are imparted. This procedure is usually repeated a number of times at other locations in an area to be surveyed. The recorded vibrations include reflections from sub-surface discontinuities. By noting the times of arrival of these reflections in a plurality of records, valuable information can be obtained regarding the depths and dips of sub-surface reflecting formations. However, it is often difficult, if not impossible, to identify the reflections in the presence of random noise vibrations which may also be recorded. As a practical matter, visual identification of common reflections in a plurality of records generally can not be made unless the signal-to-noise ratio is greater than about 1.5. Unfortunately, records of this quality can not always be obtained in many areas.

In order to increase the signal-to-noise ratio in records of this type, it is common practice to sum a plurality of records so that the desired reflections tend to be amplified whereas random noise vibrations tend to cancel one another. In many areas, compositing procedures of this type are valuable in improving the recognition of reflections in seismic records.

This invention is directed toward providing a system for measuring the degree of correlation between signals. A plurality of signals to be measured are first summed to provide a composite signal. This composite signal is then divided into first and second signals which represent the amplitudes of the composite signal on alternate half cycles. The individual signals are then compared with the composite signal to determine the degree of coherence therebetween. This is accomplished by dividing the individual signals into two parts of opposite phase and applying these separate parts to the inputs of respective gate circuits. The divided parts of the composite signal are applied to control the operation of the gate circuits so that signals are transmitted through the gates only when the individual signals are substantially in phase with the composite signal. This permits the degree of correlation between the individual signals and the composite signal to be determined.

Accordingly, it is an object of this invention to provide a system for measuring the degree of correlation between signals.

Another object is to provide an improved procedure for interpreting seismic records to identify reflections in the presence of random noise vibrations.

A further object is to provide a procedure for measuring the degree of correlation between individual signals and the sum of a plurality of such signals.

Other objects, advantages and features of the invention should become apparent from the following detailed description, taken in conjunction with the accompanying drawing in which.

Figure 1:
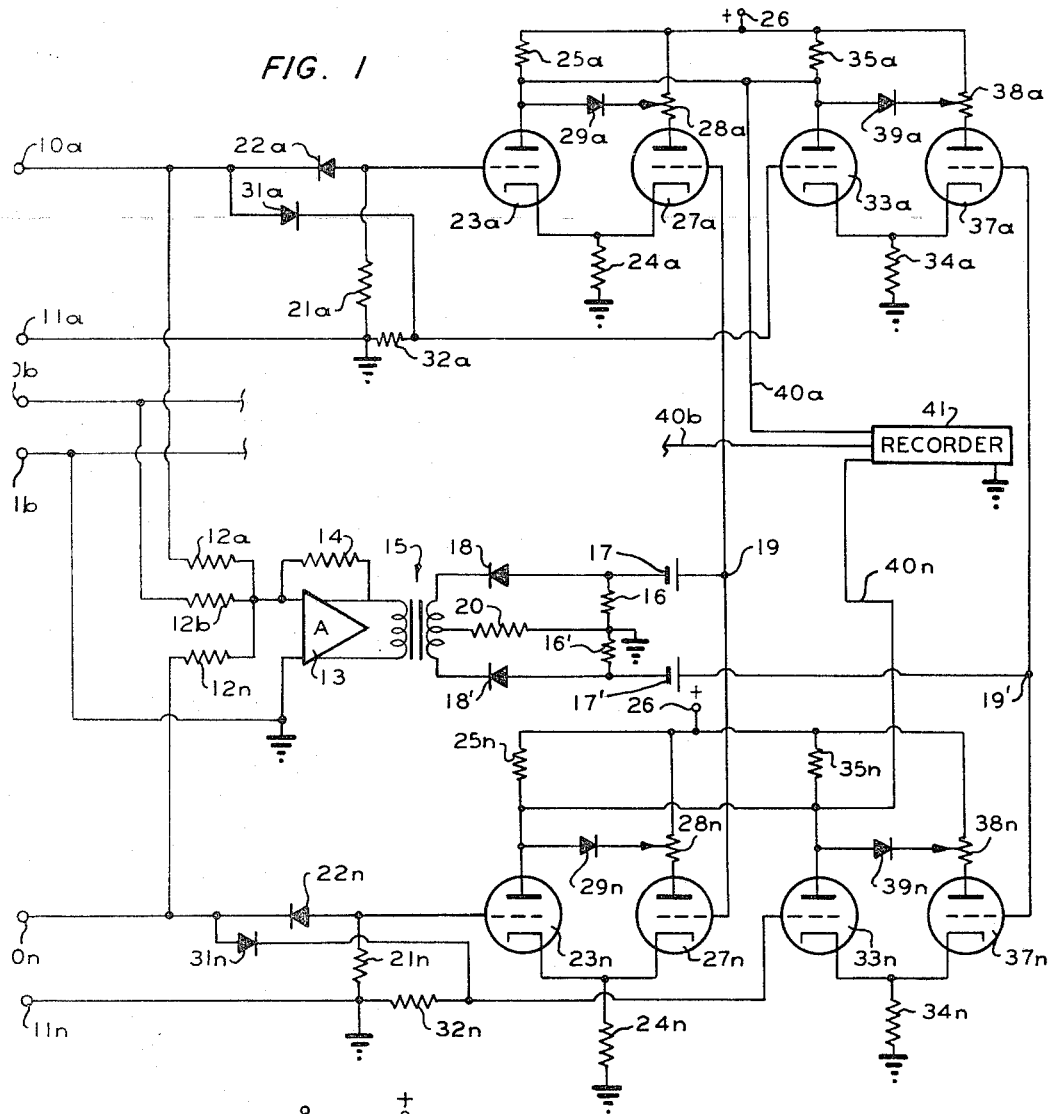
FIGURE 1 is a schematic circuit drawing of a first embodiment of the apparatus of this invention.

Referring now to the drawing in detail and to FIGURE 1 in particular, the first of a plurality of signals to be studied is applied between input terminals $10a$ and $11a$. Other signals are likewise applied between input terminals $10b$, $11b$ . . . $10n$, $11n$. There are as many sets of input terminals provided as there are signals to be correlated in one operation. The input signals applied to the circuit of FIGURE 1 can be signals obtained from seismic exploration procedures. These signals are usually recorded in the field and subsequently processed to determine the presence of common reflections in the original signals. This processing can advantageously be accomplished by recording the signals initially on magnetic tapes which readily permit reproduction for compositing purposes. When it is desired to compare a plurality of records obtained in a given area, corrections are initially made to compensate for angularity of path and static factors such as the weathered layer and differences in elevation. Typical seismic signals of the type applied between input terminals $10a$, $11a$; $10b$, $11b$; . . . $10n$, $11n$ are illustrated by wave forms $50a$, $50b$, . . . $50n$, respectively, of FIGURE 3.

Figure 3:
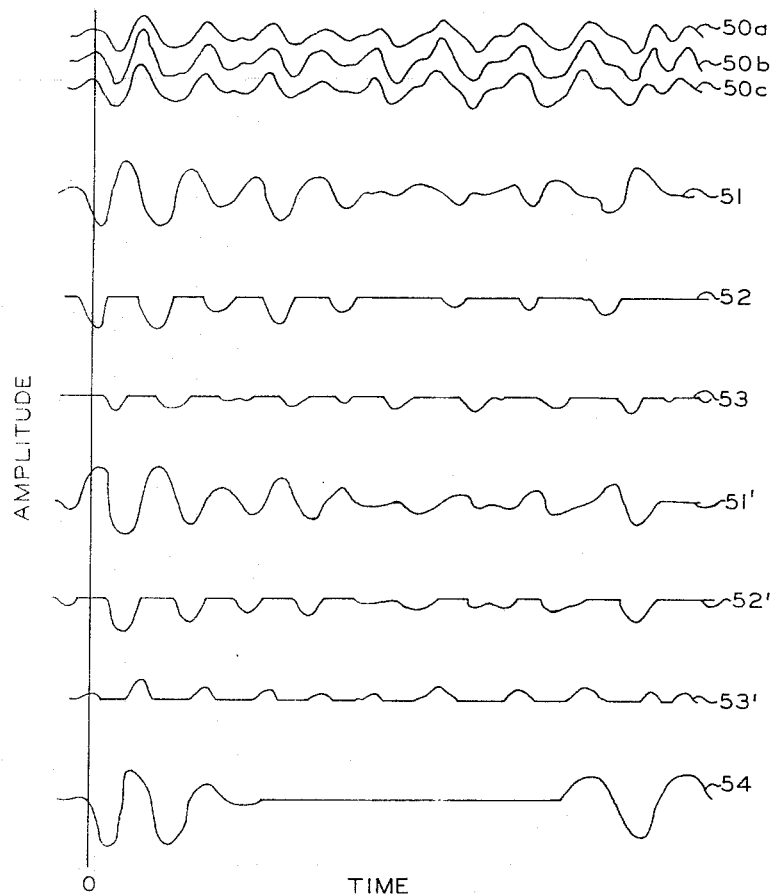
FIGURE 3 is a schematic representation of typical wave forms which appear at various points in the circuit of FIGURE 1.

Input terminals $10a$, $10b$ . . . $10n$ are connected by respective resistors $12a$, $12b$ . . . $12n$ to the first input of a conventional summing amplifier 13. This amplifier is provided with a feedback resistor 14 which has a value equal to the value of each of the input resistors. Input terminals $11a$, $11b$ . . . $11n$ are connected to the second input of amplifier 13. The output signal from amplifier 13, which represents the sum of the input signals, is applied to the primary winding of a transformer 15. The center tap of the secondary winding of transformer 15 is connected to ground through a resistor 20. A resistor 16 and a rectifier 18 are connected between ground and the first end terminal of the secondary winding of transformer 15. A voltage source 17 is connected between the junction between elements 16 and 18 and an output terminal 19. Similar elements designated by like primed reference numerals are connected in circuit with the second terminal of the secondary winding of transformer 15. Wave forms 51 and 51′ of FIGURE 3 represent summed signals, 180° out of phase with one another, which appear at the inputs of respective rectifiers 18 and 18′. The corresponding rectified signals which appear at terminals 19 and 19′ are illustrated by respective wave forms 52 and 52′. It should thus be evident that a negative signal appears at output terminal 19 during corresponding first half cycles of the signal transmitted through transformer 15, and a negative signal appears at terminal 19′ during corresponding second half cycles.

A resistor $21a$ and a rectifier $22a$ are connected between terminal $11a$ and terminal $10a$. The junction between resistor $21a$ and rectifier $22a$ is connected to the control grid of a vacuum tube $23a$. The cathode of tube $23a$ is connected to ground through a resistor $24a$. A resistor $25a$ is connected between the anode of tube $23a$ and a positive potential terminal 26. Terminal 19 is connected to the control grid of a second vacuum tube $27a$. The cathode of tube $27a$ is also connected to ground by resistor $24a$. A potentiometer $28a$ is connected between the anode of tube $27a$ and terminal 26. A rectifier $29a$ is connected between the anode of tube $23a$ and the contactor of potentiometer $28a$. The anode of tube $23a$ is connected by means of a contactor $40a$ to the first input of a recorder 41.

A rectifier $31a$ and a resistor $32a$ are connected between terminal $10a$ and terminal $11a$. The junction between rectifier $31a$ and resistor $32a$ is connected to the control grid of a third vacuum tube 33a. Terminal 19' is connected to the control grid of a fourth vacuum tube 37a. The cathodes of tubes 33a and 37a are connected to ground through a common resistor 34a. The anodes of tubes 33a and 37 are connected to terminal 26 through a resistor 35a and a potentiometer 38a, respectively. A rectifier 39a is connected between the anode of tube 33a and the contactor of potentiometer 38a. The anode of tube 33a is also connected to the first input of recorder 41 by conductor 40a.

As previously mentioned, negative signals appear at terminals 19 and 19' on alternate half cycles of the output signal from amplifier 13. The resulting negative potential at terminal 19 serves to control the gate circuit formed by tubes 23a and 27a. These tubes and the circuit elements associated therewith are selected so that triode 27a normally conducts in the absence of a negative signal being applied to terminal 19 from amplifier 13. Tube 23a does not conduct when tube 27a is conducting. Thus, the gate is effectively turned "off" initially. Tubes 33a and 37a operate in the same manner, except that they are controlled by the potential at terminal 19'. In normal operation, negative signals appear at terminals 19 and 19' on alternate half cycles of the output signal from amplifier 13. These signals may be of such magnitude as to cause tubes 27a and 37a to become nonconductive. As such, there is a decrease in potential on the cathodes of tubes 23a and 33a which is sufficient to permit tubes 23a and 33a to conduct. The purpose of rectifier 29a, for example, is to maintain a relatively constant potential on the anode of tube 23a when the gate is switched from the "off" to "on" state. In the absence of element 29a, there is a relatively large potential change at the anode of tube 23a when it changes from conducting to non-conducting states, and vice versa. Element 29a can serve as a voltage clamp to minimize these rapid fluctuations, and thereby provide a smooth output signal. The signals applied to the control grid of tubes 23a and 33a are the voltages which appear across respective resistors 21a and 32a. As can be seen from an inspection of the drawing, voltages appear across these resistors on alternate half cycles due to the presence of rectifiers 22a and 31a. Typical wave forms of the type applied to the control grids of tubes 23a and 27a are represented by respective curves 53 and 53' of FIGURE 3.

During a first half cycle of operation, a negative potential from terminal 19' is applied to the control grid of tube 37a to cut off this tube and enable tube 33a to become conductive, thereby turning the gate "on." If the polarity of the signal 50a between terminals 10a and 11a is in phase with the sum of the signals at the output of amplifier 13, a positive potential (wave form 53') from terminal 10a is applied to the grid of tube 33a. This increases the conduction by tube 33a, thereby decreasing the potential at the anode. Thus, a decreasing potential pulse is applied to recorder 41. On the following half cycle, a negative potential from terminal 19 is applied to the control grid of tube 27a, which permits tube 23a to conduct. At this same time, the polarity of the signal 50a between terminals 10a and 11a probably has reversed so that a negative potential (wave form 53) from terminal 10a is applied to the grid of tube 23a. This decreases the conduction by tube 23a to apply an increasing potential pulse to recorder 41. If the signal between terminals 10a and 11a should be 180° out of phase with the sum, there will be no fluctuating potential applied to recorder 41 from the gates. At intermediate phase relationships, the gates are on for limited amounts of time. It should thus be evident that the amplitude of the signal applied to the recorder is a direct function of the degree of correlation between the input signal and the composite sum of the several input signals. A typical wave form of the signal recorded by 41 is illustrated by curve 54 of FIGURE 3. The amplitude of this curve is a direct function of the correlation between individual curves 50a, 50b, . . . 50n and the sum of these curves.

Gate circuits of the type described are associated with each pair of input terminals. The gate circuit associated with terminals 10n and 11n is illustrated by corresponding reference numerals. The output signal from this circuit is transmitted to recorder 41 by contactor 40n.

Voltage sources 17 and 17' are employed to apply biasing potentials to terminals 19 and 19'. These biasing potentials require that signals 52 and 52' be of greater amplitude to cut off tubes 27a and 37a because the biasing potentials must also be overcome. A net gain in the ratio of signal to noise can be obtained in this manner by eliminating output signals near the zero crossings of the composite signal. If automatic gain control circuits are employed in the initial recording of the seismic signals, it is generally desirable to employ biasing voltages on the rectifiers of FIGURE 1 such that these biasing potentials are approximately one-fourth of the peak amplitude of the signals transmitted by summing amplifier 13, for example.

Figure 2:
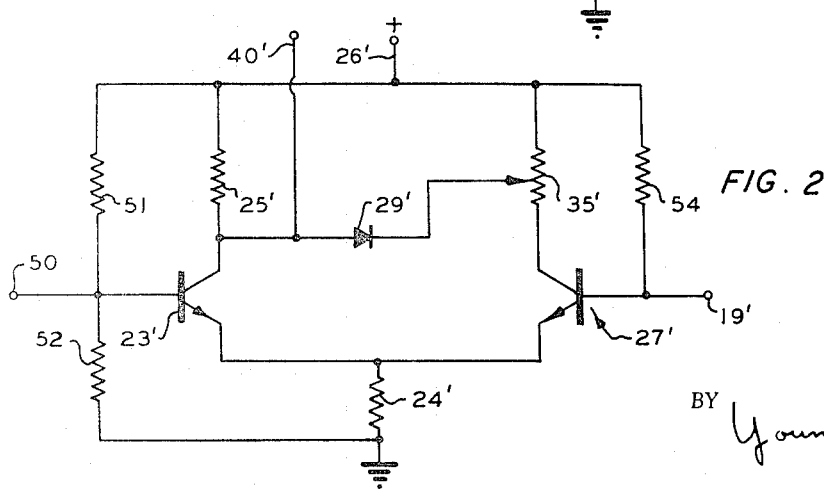
FIGURE 2 is a schematic circuit drawing of a second embodiment of a gate circuit which can be employed in the apparatus of FIGURE 1.

A second embodiment of the gate circuit which can be employed in the apparatus of this invention is illustrated in FIGURE 2. The circuit of FIGURE 2 is similar in many respects to the gate circuits of FIGURE 1, and corresponding elements have been designated by like primed reference numerals. The vacuum tubes 23a and 27a of FIGURE 1 have been replaced by respective transistors 23' and 27' in the circuit of FIGURE 2. Input terminal 50, which would be connected to the junction between resistor 21a and rectifier 22a of FIGURE 1, is connected to the base of transistor 23'. Biasing resistors 51 and 52 are connected between the base of this transistor and terminal 26' and ground, respectively. A biasing resistor 54 is connected between input control terminal 19' and potential terminal 26'. Otherwise the gate circuit of FIGURE 2 employs circuit elements which correspond to the gate circuits of FIGURE 1.

While this invention has been described in conjunction with presently preferred embodiments, it should be evident that it is not limited thereto.

What is claimed is:

1. Signal coherence measuring apparatus comprising means adapted to sum a plurality of alternating input signals; means responsive to the output of said means to sum to establish first and second output signals which are representative of respective alternate half cycles of the output of said means to sum; means responsive to one of the input signals to establish third and fourth output signals which are representative of alternate half cycles of said one input signal; first and second gate circuits, each having an input, an output and a control means; means to apply said third and fourth signals to the respective inputs of said first and second gate circuits; means to apply said first and second signals to the control means of said first and second gate circuits, respectively; and means to combine the outputs of said first and second gate circuits.

2. The apparatus of claim 1 wherein said means to sum and said means responsive to the output of said means to sum comprise a summing amplifier having an input and an output, a transformer having a primary winding and a secondary winding, said secondary winding having a center tap, said primary winding being connected to the output of said summing amplifier, means connecting the center tap of the secondary winding of said transformer to a ground, first and second resistors, first and second rectifiers, means connecting said first resistor and said first rectifier in series between said region of reference potential and the first end terminal of the secondary winding of said transformer, and means connecting said second resistor and said second rectifier in series between said ground and the second end terminal of the secondary winding of said transformer, the voltages across said resistors representing said first and second signals.

3. The apparatus of claim 2, further comprising first and second output terminals, a first voltage source connected between said first output terminal and the junction between said first resistor and said first rectifier, and a second voltage source connected between second output terminal and the junction between said second resistor and said second rectifier, said voltage sources being poled so as to oppose the potentials applied to the output terminals from the rectifiers.

4. The apparatus of claim 1 wherein each of said gate circuits comprises first and second signal amplifying means, each having an input and an output, said first amplifying means being adapted to receive one of said first and second signals at its input and said second amplifying means being adapted to receive one of said third and fourth signals at its input; and means interconnecting said first and second amplifying means so that said second amplifying means does not amplify input signals except when an input signal is applied to the input of said first amplifying means.

5. The apparatus of claim 1 wherein each of said gate circuits comprises first and second vacuum tubes, each having an anode, a cathode and a control grid; a source of potential which is positive with respect to ground; first and second resistance elements connecting the respective anodes of said tubes to said source of potential; and a third resistance element connecting each of said cathodes to ground; the control grids of said tubes constituting the respective inputs thereof.

6. The apparatus of claim 1 wherein each of said gate circuits comprises first and second transistors, each having a base, a collector and an emitter; a source of potential which is positive with respect to ground; first and second resistance elements connecting the respective collectors to said source of potential; and a third resistance element connecting each of said emitters to ground; the bases of said transistors constituting the respective inputs thereof.

7. Signal coherence measuring apparatus comprising means adapted to sum a plurality of alternating input signals; rectifier means responsive to the output of said means to sum to establish first and second output signals which are representative of respective alternate half cycles of the output of said means to sum; a plurality of second rectifier means, each responsive to one of the input signals to establish a plurality of third and fourth signals which are representative of alternate half cycles of respective ones of said input signals; a plurality of first and second gate circuits, each having an input, an output and a control means; means to apply each of said third and fourth signals to the respective inputs of respective ones of said first and second gate circuits; means to apply said first and second signals to the control means of said gate circuits; and means to combine separately the outputs of each of said first and second gate circuits.

No references cited.

ARTHUR GAUSS, *Primary Examiner.*

J. ZAZWORSKY, *Assistant Examiner.*